(12) United States Patent
Summers et al.

(10) Patent No.: US 11,539,694 B2
(45) Date of Patent: Dec. 27, 2022

(54) METHOD AND SYSTEM FOR CONTEXT AWARE FRICTIONLESS AUTHENTICATION BASED ON AUTHENTICATION SCORES

(71) Applicant: Citrix Systems, Inc., Fort Lauderdale, FL (US)

(72) Inventors: Jacob Summers, Coral Springs, FL (US); Manbinder Pal Singh, Coral Springs, FL (US); Harsh Shah, Pompano Beach, FL (US); Rachelle Tobkes, Davie, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 166 days.

(21) Appl. No.: 16/895,321

(22) Filed: Jun. 8, 2020

(65) Prior Publication Data
US 2021/0385215 A1   Dec. 9, 2021

(51) Int. Cl.
*H04L 9/40* (2022.01)

(52) U.S. Cl.
CPC ........ *H04L 63/0876* (2013.01); *H04L 63/102* (2013.01)

(58) Field of Classification Search
CPC ............... H04L 63/0876; H04L 63/102; H04L 63/0861; H04L 2463/082; H04W 12/06; H04W 12/60; H04W 12/63; H04W 12/67; H04W 12/68
See application file for complete search history.

(56) References Cited

U.S. PATENT DOCUMENTS

| | | | |
|---|---|---|---|
| 2011/0035788 A1* | 2/2011 | White | H04L 9/3231 726/4 |
| 2015/0089585 A1* | 3/2015 | Novack | H04L 63/08 726/3 |
| 2018/0034859 A1* | 2/2018 | Aronowitz | H04L 63/08 |

OTHER PUBLICATIONS

International Search Report and Written Opinion on PCT Appl. No. PCT/US2021/034735 dated Sep. 13, 2021.

* cited by examiner

*Primary Examiner* — Khoi V Le
(74) *Attorney, Agent, or Firm* — Foley & Lardner LLP

(57) ABSTRACT

Described embodiments provide systems and methods for context aware frictionless authentication. A server may determine authentication method information, contextual scores and contextual weights of a device, in connection with a user request to access a resource via the device. The authentication method information may include a weight and a completion duration for each of a plurality of authentication methods available via the device. The server may determine an authentication score for each of the plurality of authentication methods using the authentication method information, the contextual scores and the contextual weights of the device. The server may identify a first authentication method from the plurality of authentication methods, according to the determined authentication score. The server may authenticate the user request via the first authentication method using a first device that supports the first authentication method.

18 Claims, 8 Drawing Sheets

METHOD AND SYSTEM FOR CONTEXT AWARE FRICTIONLESS AUTHENTICATION BASED ON AUTHENTICATION SCORES

FIELD OF THE DISCLOSURE

The present application generally relates to authentication, including but not limited to systems and methods for context aware authentication based on authentication scores.

BACKGROUND

Various services, programs, or other resource may be used, accessed, or otherwise provided to users via their respective devices. Some resources may require authentication for accessing the resource. Different devices may support different types, forms, or methods of authentication, and some methods of authentication may be easier to perform than others. Additionally, some methods of authentication may be more secure than others.

SUMMARY

This Summary is provided to introduce a selection of concepts in a simplified form that is further described below in the Detailed Description. This Summary is not intended to identify key features or essential features, nor is it intended to limit the scope of the claims included herewith.

Systems and methods for context aware authentication are described herein. More particularly, the systems and methods described herein may support authentication based on or using authentication scores for various available authentication methods.

In a computing environment, there are many ways in which user authentication may be performed. Some authentication methods may be easier to perform than others, and some authentication methods may be more secure than others. However, in most computing environments, there is limited (or an absence of) flexibility and contextual awareness in an authentication system. Furthermore, authentication systems may not be able to determine optimal authentication methods which are easiest to perform while still being secure. For instance, a user may have a mobile device including a front-facing camera and may also have a laptop device including a webcam. Where the user is to authenticate themselves via facial recognition, the user has two device options for authentication. However, based on contextual factors, it may be more optimal to authenticate via one of these two devices. For example, if the user is currently not in possession of the mobile device or the mobile device is positioned in the user's pocket, it may be more efficient to authenticate the user via the webcam of the laptop device so that the user does not have to retrieve the mobile device for authentication.

This disclosure is directed to systems and methods for context aware authentication that balances ease-of-use and security for dynamic selection of authentication methods. In one embodiment, a server determines authentication method information, contextual scores and contextual weights of at least one device in connection with a user request to access a resource via the at least one device. The authentication method information may include a weight and a completion duration for each of a plurality of authentication methods available via the at least one device. The server may determine an authentication score for each of the plurality of authentication methods using the authentication method information, the contextual scores and the contextual weights of the at least one device. The server may identify a first authentication method from the plurality of authentication methods according to the determined authentication scores. The server may authenticate the user request via the first authentication method using a first device from the at least one device that supports the first authentication method.

According to the implementations and embodiments described herein, the authentication score is leveraged in a method and system that aims to enforce the security thresholds that an organization would want to apply, while at the same time selecting the most convenient of the authentication methods available to the user. The systems and methods described herein compute the authentication score(s) dynamically, taking into account various characteristics of the authentication methods, but also contextual factors of the user's situation and device state. Moreover, the systems and methods described herein can be integrated into various platforms, such an application workspace and an analytics service, to permit organizations to implement a desired balance between security and user experience. Various other advantages are described in greater detail below.

In one aspect, this disclosure is directed to a method. The method may include determining, by at least one server, authentication method information, contextual scores and contextual weights of at least one device, in connection with a user request to access a resource via the at least one device. The authentication method information may include a weight and a completion duration for each of a plurality of authentication methods available via the at least one device. The method may include determining, by the at least one server, an authentication score for each of the plurality of authentication methods, using the authentication method information, the contextual scores and the contextual weights of the at least one device. The method may include identifying, by the at least one server, a first authentication method from the plurality of authentication methods, according to the determined authentication scores. The method may include authenticating, by the at least one server, the user request via the first authentication method using a first device from the at least one device that supports the first authentication method.

In some embodiments, the method may further include comparing, by the at least one server, one or more of the determined authentication scores to an authentication score threshold. The method may further include selecting, by the at least one server, the first authentication method from the plurality of authentication methods based on the authentication score of the first authentication method satisfying the authentication score threshold. In some embodiments, the method may further include identifying, by the at least one server, a subset of the plurality of authentication methods. A sum of authentication scores of one or more authentication methods in the subset may satisfy the authentication score threshold. Authenticating the user request may include authenticating, by the at least one server, the user request via the subset of the plurality of authentication methods.

In some embodiments, the method may further include determining, by the at least one server, using the authentication method information, that each of the plurality of authentication methods are available via the at least one device. In some embodiments, the method may further include determining, by the at least one server, for a first authentication method of the plurality of authentication methods, an average duration for completing the first authentication method. The average duration may be determined based on historical data corresponding to the first authentication method. In some embodiments, determining the contextual scores and the contextual weights of the at least one device includes receiving, by the at least one server, from the at least one device, one or more contextual factors for the at least one device, and determining, by the at least one server, the contextual scores and the contextual weights of the one or more contextual factors.

In some embodiments, a first contextual factor of the one or more contextual factors comprises a position of the at least one device, and one of the contextual scores indicates an ease-of-use of the at least one device from the position for authentication. In some embodiments, a first contextual factor of the one or more contextual factors comprises a location of the at least one device, and one of the contextual scores indicates an availability of a respective authentication method using the at least one device at the location. In some embodiments, a first contextual factor of the one or more contextual factors comprises a network connection of the at least one device, and one of the contextual scores indicates a level of security in using the network connection for authentication.

In some embodiments, the method further includes assigning, by the at least one server, a first weight to a first authentication method of the plurality of authentication methods. The authentication score of the first authentication method may be a linear function of the first weight of the first authentication method. In some embodiments, the method further includes selecting, by the at least one server, a subset of the plurality of authentication methods which satisfies an authentication score threshold. The method may further include providing, by the at least one server, the subset of the plurality of authentication methods for selection.

In another aspect, this disclosure is directed to a system. The system may include at least one server including at least one processor. The at least one server may be configured to determine authentication method information, contextual scores and contextual weights of at least one device, in connection with a user request to access a resource via the at least one device. The authentication method information may include a weight and a completion duration for each of a plurality of authentication methods available via the at least one device. The at least one server may be configured to determine an authentication score for each of the plurality of authentication methods, using the authentication method information, the contextual scores and the contextual weights of the at least one device. The at least one server may be configured to identify a first authentication method from the plurality of authentication methods, according to the determined authentication scores. The at least one server may be configured to authenticate the user request via the first authentication method using a first device from the at least one device that supports the first authentication method.

In some embodiments, the at least one server is further configured to compare one or more of the determined authentication scores to an authentication score threshold, and select the first authentication method from the plurality of authentication methods based on the authentication score of the first authentication method satisfying the authentication score threshold. In some embodiments, the at least one server is further configured to select a subset of authentication methods. A sum of authentication scores of one or more authentication methods in the subset may satisfy the authentication score threshold. Authenticating the user request may include authenticating the user request via the subset of the plurality of authentication methods. In some embodiments, the at least one server is further configured to determine, using the authentication method information, that each of the plurality of authentication methods are available via the at least one device. In some embodiments, the at least one server is further configured to determine, for a first authentication method of the plurality of authentication methods, an average duration for completing the first authentication method.

The average duration may be determined based on historical data corresponding to the first authentication method. In some embodiments, determining the contextual scores and the contextual weights of the at least one device includes receiving, from the at least one device, one or more contextual factors for the at least one device, and determining the contextual scores and the contextual weights of the one or more contextual factors. In some embodiments, a first contextual factor of the one or more contextual factors comprises a position of the at least one device, and one of the contextual scores indicates an ease-of-use of the at least one device from the position for authentication. In some embodiments, a first contextual factor of the one or more contextual factors comprises a network connection of the at least one device, and one of the contextual scores indicates a level of security in using the at least one device using the network connection for authentication.

In yet another aspect, this disclosure is directed to non-transitory computer readable medium storing program instructions for causing one or more processors to determine authentication method information, contextual scores and contextual weights of at least one device, in connection with a user request to access a resource via the at least one device. The authentication method information may include a weight and a completion duration for each of a plurality of authentication methods available via the at least one device. The instructions may cause the one or more processors to determine an authentication score for each of the plurality of authentication methods, using the authentication method information, the contextual scores and the contextual weights of the at least one device. The instructions may cause the one or more processors to identify a first authentication method from the plurality of authentication methods, according to the determined authentication scores. The instructions may cause the one or more processors to authenticate the user request via the first authentication method and a first device from the at least one device that supports the first authentication method.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, with emphasis instead being placed upon illustrating embodiments, principles, and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for providing a clustered appliance architecture environment;

Section D describes embodiments of systems and methods for providing a clustered appliance architecture environment; and Section E describes embodiments of systems and methods for context aware frictionless authentication.

A. Network and Computing Environment

Figure 1A:
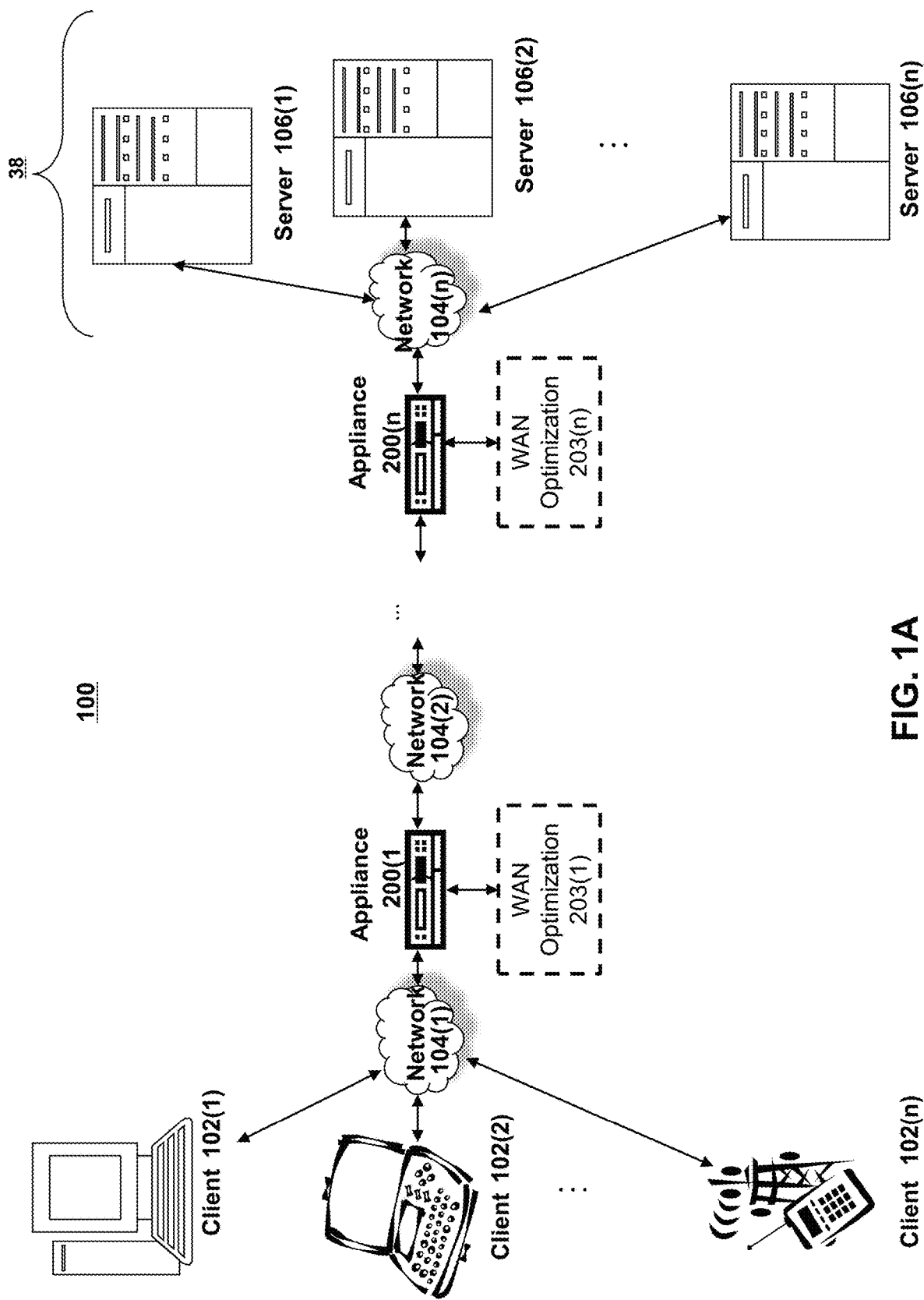
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
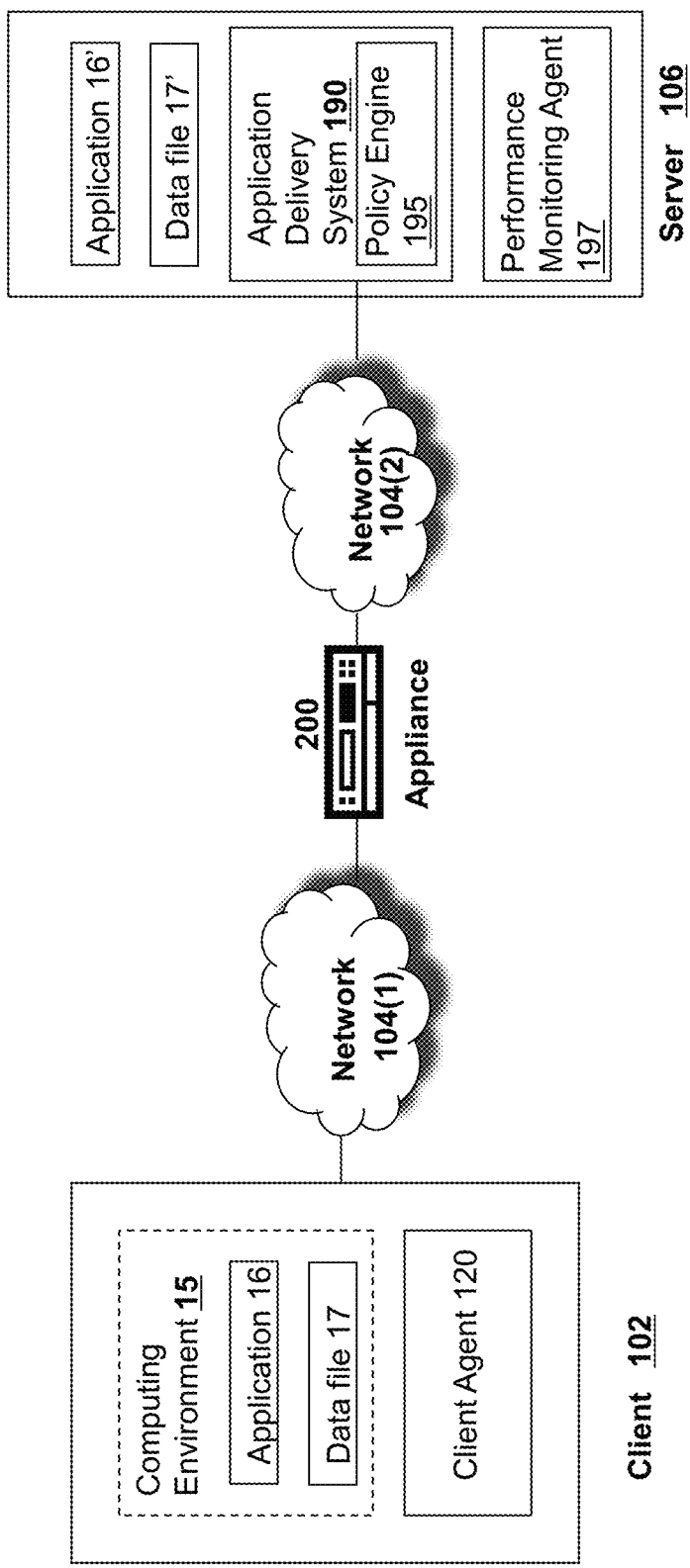
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
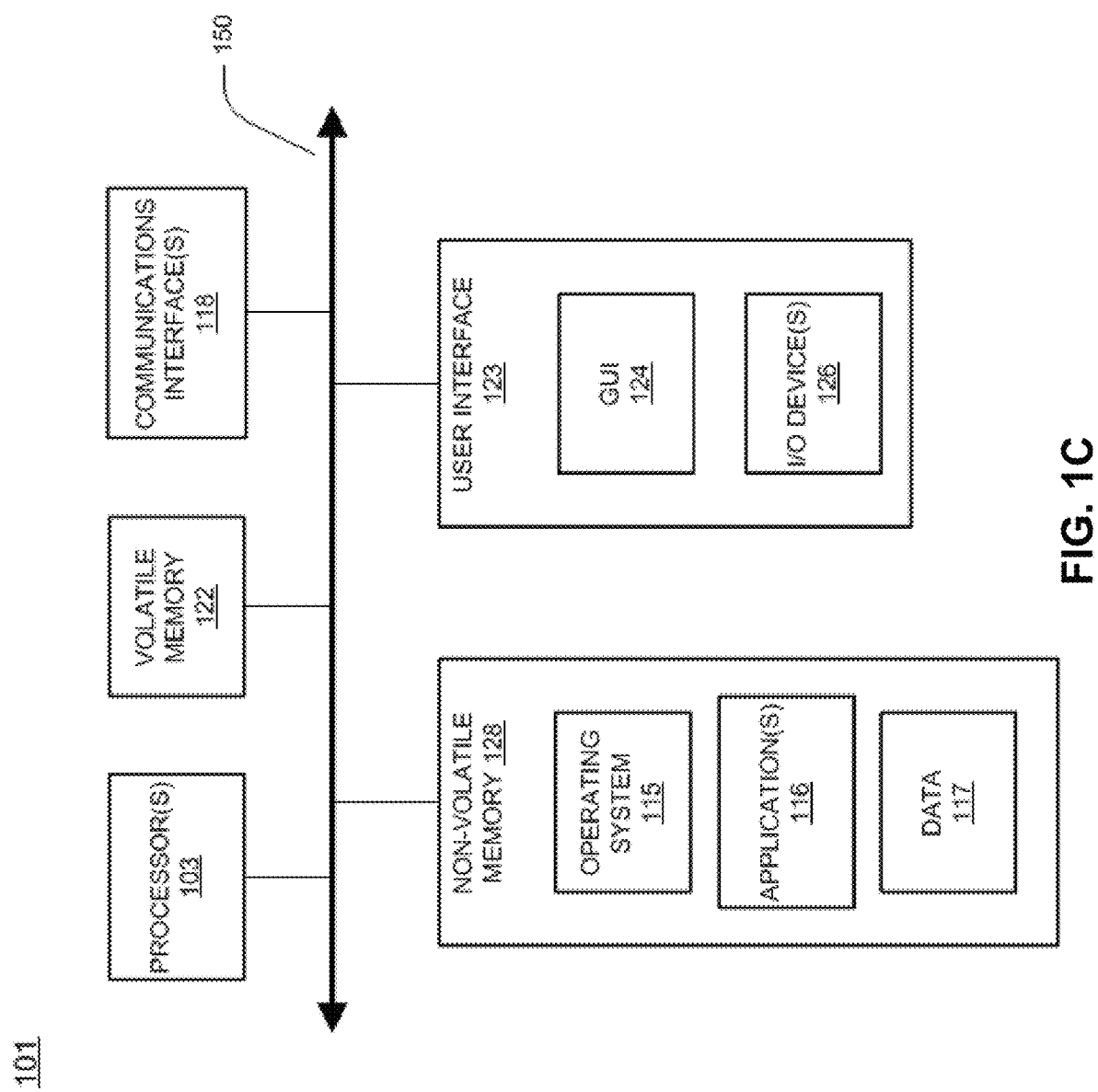
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
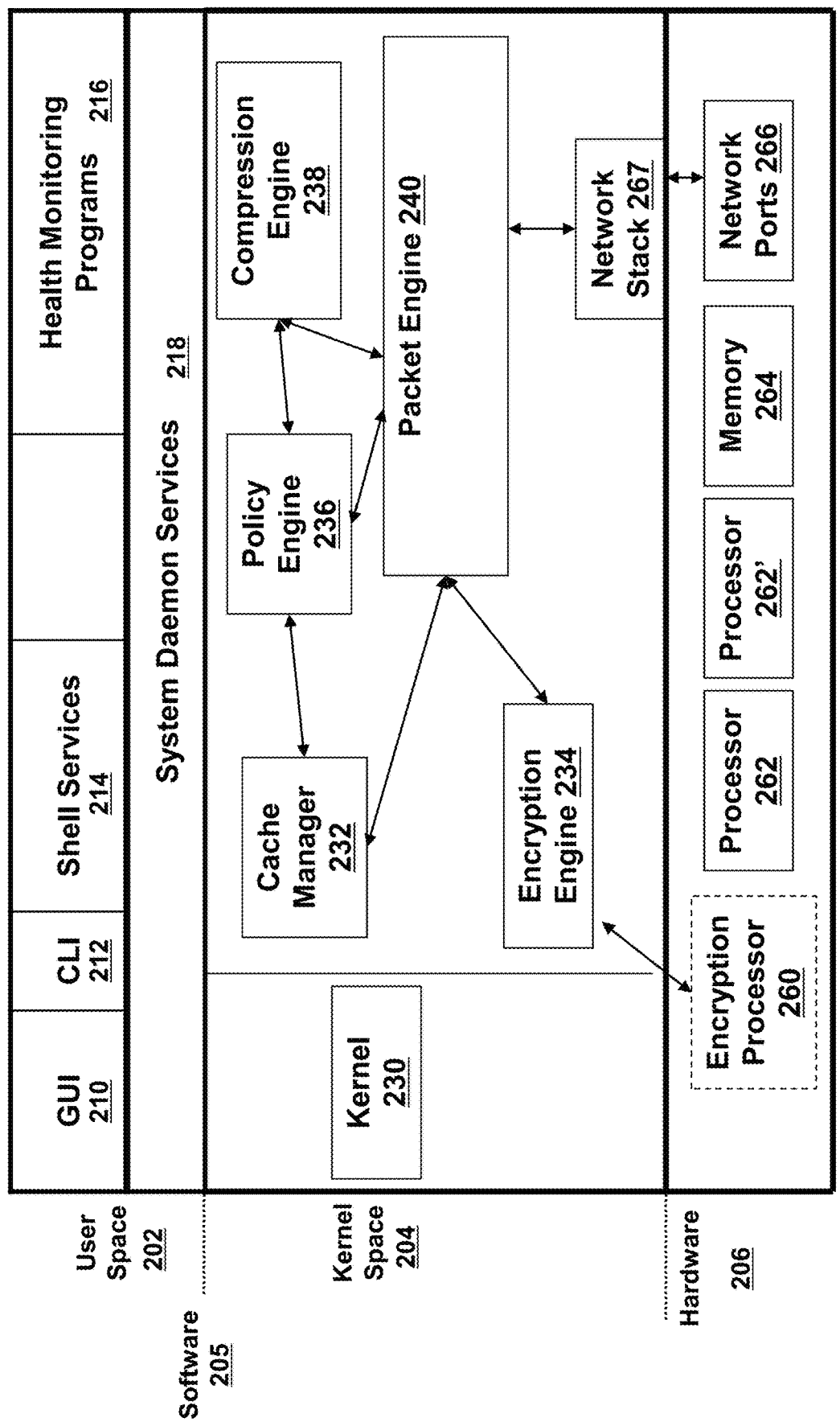
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Virtualizing an Application Delivery Controller

Figure 3:
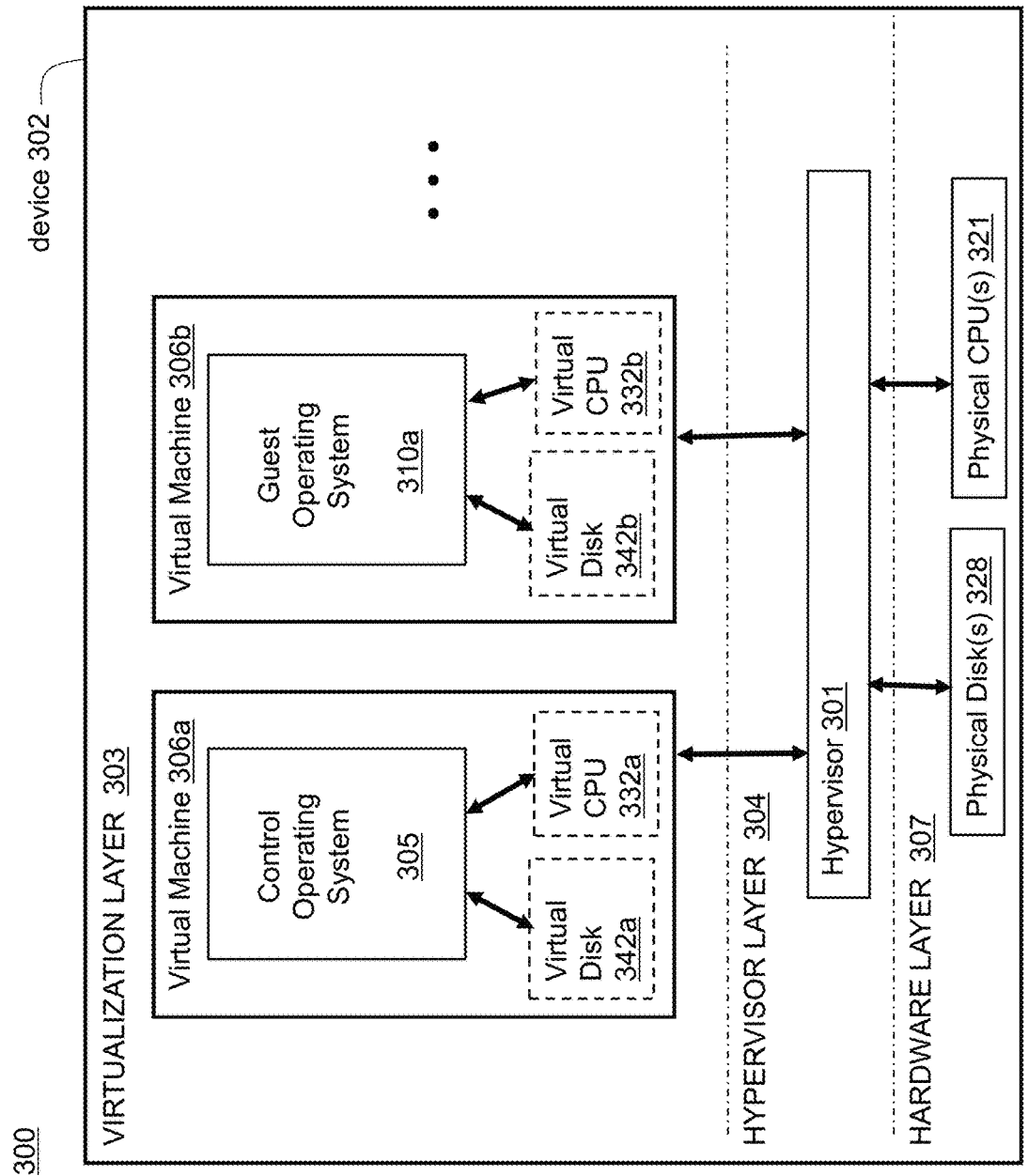
FIG. 3 is a block diagram of a virtualization environment, in accordance with an illustrative embodiment.

Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
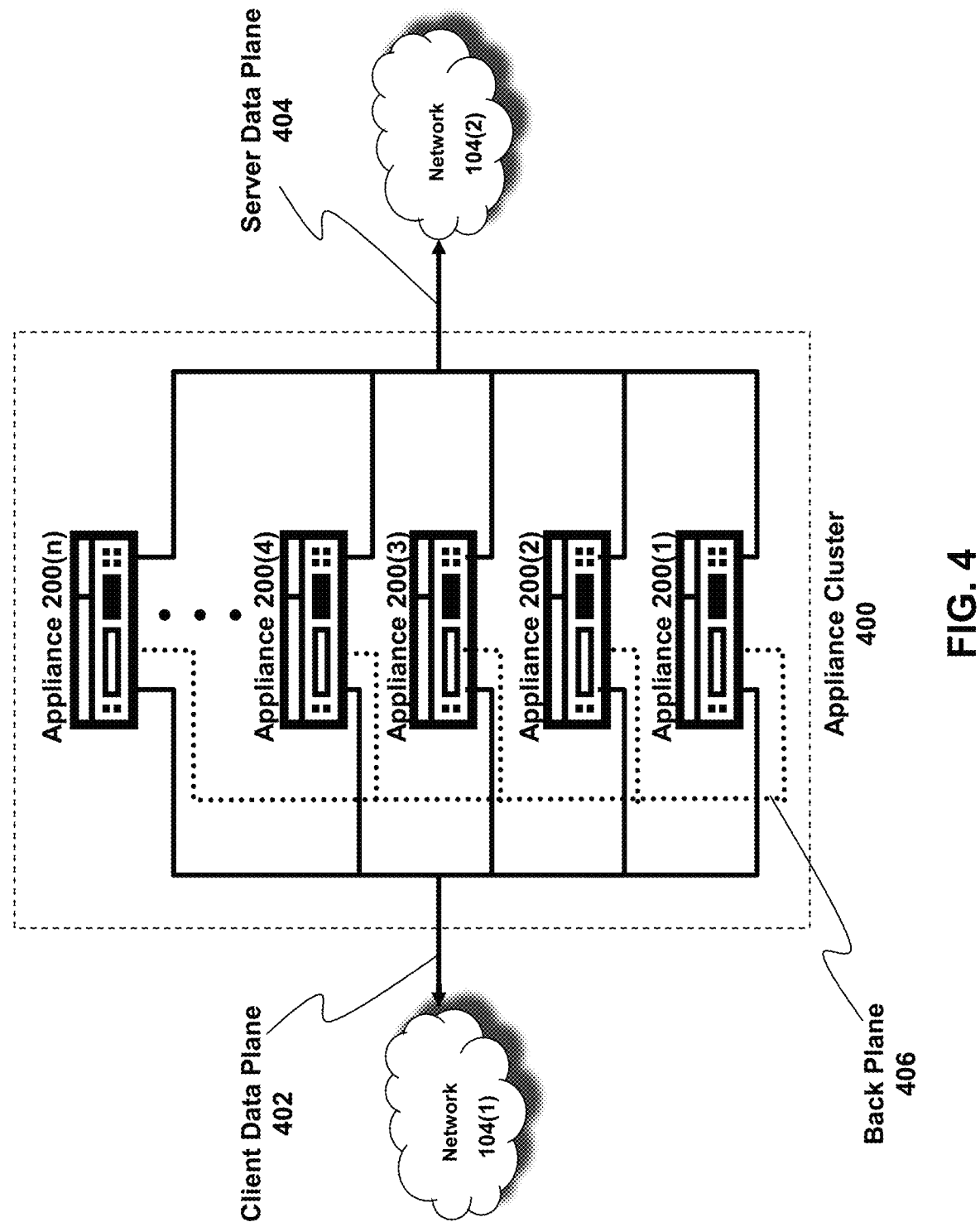
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

E. Systems and Methods for Context Aware Authentication

Systems and methods for context aware authentication are described herein. More particularly, the systems and methods described herein may support authentication based on or using authentication scores for various available authentication methods.

In a computing environment, there are many ways in which user or user request authentication may be performed. Some authentication methods may be easier to perform than others, and some authentication methods may be more secure than others. However, in most computing environments, there is limited or no flexibility and contextual awareness in an authentication system. Furthermore, authentication systems may not determine optimal authentication methods which are easiest to perform while still being secure. For instance, a user may have a mobile device including a front-facing camera and may also have a laptop device including a webcam. Where the user is to authenticate themselves via facial recognition, the user has two device options for authentication. However, based on contextual factors, it may be more optimal to authenticate via one of the two devices. For example, if the user is currently not in possession of the mobile device or the mobile device is positioned in the user's pocket, it may be more efficient to authenticate the user via the webcam of the laptop device so that the user does not have to retrieve the mobile device for authentication.

This disclosure is directed to systems and methods for context aware frictionless authentication that balances ease-of-use and security for dynamic selection of authentication methods. In one embodiment, a server determines authentication method information, contextual scores and contextual weights of at least one device in connection with a user request to access a resource via the at least one device. The authentication method information may include a weight and a completion duration for each of a plurality of authentication methods available via the at least one device. The server may determine an authentication score for each of the plurality of authentication methods using the authentication method information, the contextual scores and the contextual weights of the at least one device. The server may identify a first authentication method from the plurality of authentication methods according to the determined authentication scores. The server may authenticate the user request via the first authentication method using a first device from the at least one device that supports the first authentication method.

According to the implementations and embodiments described herein, the authentication score is leveraged in a method and system that aims to enforce the security thresholds that an organization would want to apply, while at the same time selecting the most convenient of the authentication methods available to the user. The systems and methods described herein compute the authentication score(s) dynamically, taking into account various characteristics of the authentication methods, but also contextual factors of the user's situation and device state. Moreover, the systems and methods described herein can be integrated into various platforms, such an application workspace environment, and/or an analytics service, to permit organizations to implement a desired balance between security and user experience. Various other advantages are described in greater detail below.

Figure 5:
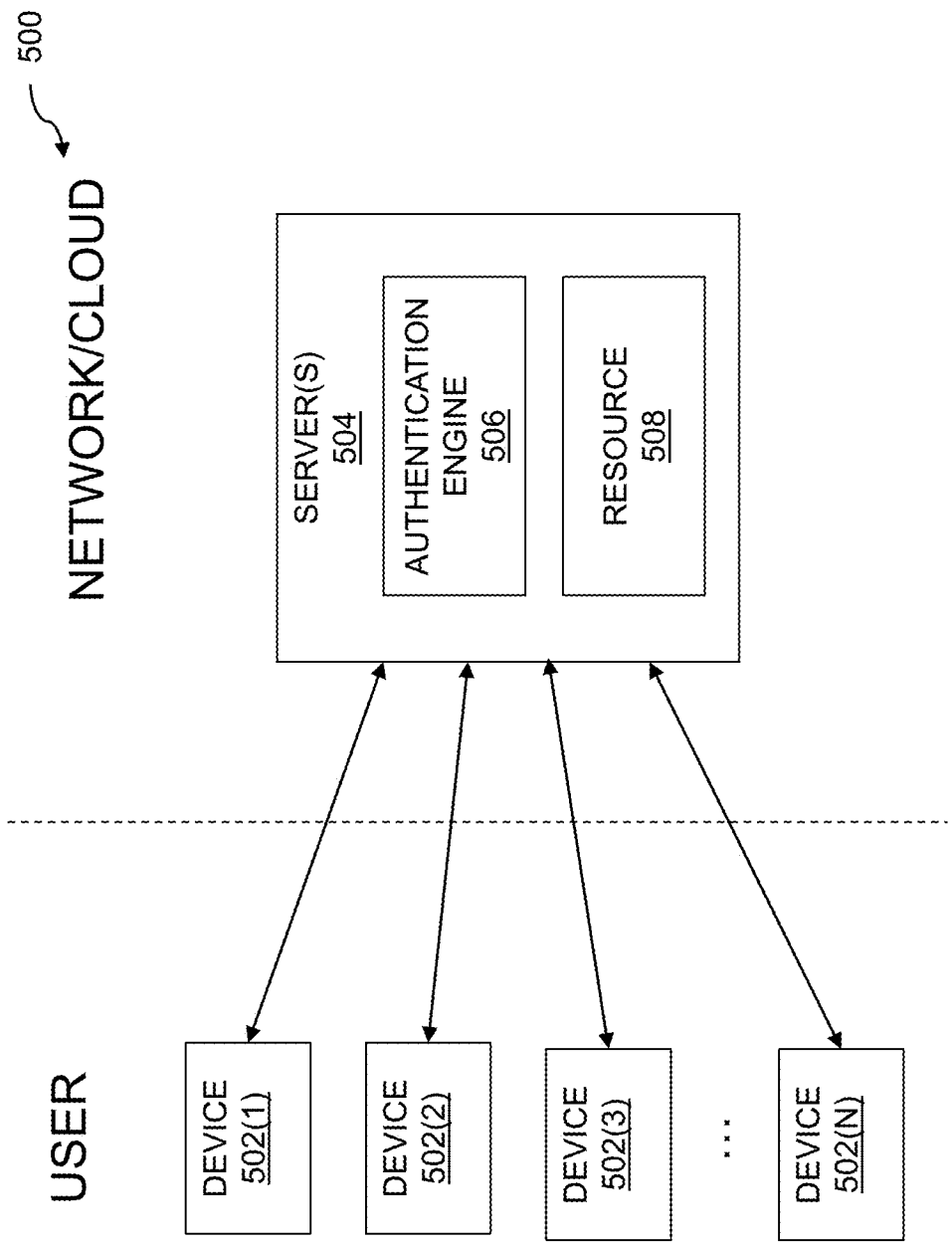
FIG. 5 is a block diagram of a system for context aware frictionless authentication, in accordance with an illustrative embodiment.

Referring now to FIG. 5, depicted is a block diagram of a system 500 for context aware frictionless authentication, according to an illustrative embodiment. The system 500 is shown to include a plurality of devices 502(1)-502(N) (also referred to as device(s) 502) communicably coupled to a server 504. The server 504 may comprise a server (e.g., a cloud-based server) accessible by the device(s) 502 via a network. In some embodiments, the system 500 may include a plurality of servers 504. An authentication engine 506 of the server 504 may be configured to determine authentication method information, contextual scores, and contextual weights of the device(s) 502 in connection with a user request to access a resource 508. The resource may be stored, hosted and/or executed on a server (e.g., application server, cloud service server), which can include the server 504 or a different server. The authentication method information may include a weight and a completion duration for each of a plurality of authentication methods available via the device(s) 502. The authentication engine 506 may be configured to calculate or otherwise determine an authentication score for each of the plurality of authentication methods using the authentication method information, the contextual scores and the contextual weights of the device(s) 502. The authentication engine 506 may be configured to identify or select a first authentication method from the plurality of authentication methods according to the determined authentication scores. The authentication engine 506 may be configured to validate or authenticate the user request via the first authentication method using a first device 502 from the device(s) 502 that supports the first authentication method.

The systems and methods of the present solution may be implemented in any type or form of device, including clients, servers or appliances described above with reference to FIG. 1A-FIG. 4. For instance, the server 504 may be implemented as embodied upon or otherwise incorporated into the server 106 described above with respect to FIGS. 1A-FIG. 1B for instance. In some embodiments, the server 504 may be implemented as, embodied upon, or otherwise incorporated into a network device or appliance 200 described above with reference to FIG. 1A-FIG. 4. The devices 502 may be similar in some respects to the clients 102 described above with respect to FIG. 1A-FIG. 1B. In other words, the devices 502, and server 504 may include or incorporate components and features similar in some aspects to those described above with reference to FIG. 1C, such as a memory and/or one or more processors operatively coupled to the memory. In some embodiments, the system 500 may include a plurality of servers 504 (similar to the server 106) hosting, executing or otherwise including respective resources 508, and the authentication engine 506 may be implemented, embodied, or otherwise incorporated into for instance an appliance 200 arranged intermediate to the device(s) 502 and servers 504. The present systems and methods may be implemented in any embodiments of, or include any aspects of, the appliances or devices described herein.

The system 500 may include a server 504. The server 504 may comprise a cloud-based server (e.g., a server in a server farm or cluster) configured to receive requests from and exchange data with one or more devices 502. The device(s) 502 may each be associated with a respective user. In some embodiments, a plurality of devices 502 may be associated with a particular user. For example, the user may be associated with a mobile device, a wearable device (such as a headset or smart watch), a laptop, a desktop, a tablet, and so forth. Each of the devices 502 may be configured to access the server 504. In other words, the user may operate one or more of a first device 502(1), second device 502(2), third device 502(3), and N-th device 502(N) to access the server 504.

Each of the devices 502 may have particular authentication capabilities based on components incorporated therein. For example, some devices 502 may be configured for voice authentication using intergrated microphones, some devices 502 may be configured for biometric authentication via facial recognition using a forward-facing camera, some devices 502 may be configured for password authentication via a key or touchpad, etc. The devices 502 may store, include, or otherwise maintain data corresponding to the respective devices 502 capabilities.

The devices 502 and/or the server 504 may be configured to monitor for, detect, determine, or otherwise identify contextual factors corresponding to the respective device 502. In some embodiments, the device 502 may communicate, report, convey or share contextual factors pertaining to the device 502, to the server 504. In certain embodiments, the server 504 may determine or identify contextual factors pertaining to the device 502, via one or more sensors and/or other device(s). The contextual factors may be or include data corresponding to a context of the device 502. The context may include or relate to, for example, a location of the device 502, a position of the device 502 (e.g., relative to the user), a network connection of the device 502, and so forth. In some embodiments, the devices 502 may be configured to identify the contextual factors based on data from one or more sensors of the device 502. For example, the device 502 may be configured to determine a location of the device 502 based on a global positioning system (GPS) sensor of the device 502. As another example, the device 502 may be configured to determine a position (e.g., orientation, tilt, direction) of the device 502 relative to the user (or another reference) based on a gyroscopic or other sensor configured to detect an orientation of the device 502. In some embodiments, the device 502 and/or the server 504 may be configured to determine a position of the device 502 relative to the user based on a combination of sensor data (e.g., sensor data from an image sensor, a light sensor and/or a gyroscope). For instance, the device 502 may be configured to determine that the device 502 is located in the user's pocket based on the device 502 having a vertical orientation via the gyroscope and that no light is detected via the light sensor. The device 502 may be configured to determine that the device 502 is located in the user's hand based on the device 502 having a vertical orientation via the gyroscope and light being detected via the light sensor. As yet another example, the device 502 may be configured to determine a network connection of the device 502 based on data from a communications interface (e.g., an antenna) of the device 502.

The user may generate a request for accessing the resource 508. The user may operate one of the device(s) 502 to generate the request. The device 502 may be configured to transmit the request to the server 504 (e.g., via a network as described above with FIG. 1A through FIG. 4). In some instances, due to the nature of the resource 508, the resource 508 may require authentication of the user request prior to providing access to the resource 508. As described in greater detail below, the user may authenticate themselves using one of the devices 502 prior to gaining access to the resource 508.

The server 504 may include an authentication engine 506. The authentication engine 506 may include any device(s), component(s), script, code, or set of instructions executable by a processor to authenticate a user (e.g., a user request). As a brief overview, the authentication engine 506 may be configured to store, maintain, include, or otherwise access authentication data from memory of the server 504 corresponding to a user. The authentication engine 506 may be configured to receive authentication data from a device 502 of the user. The authentication engine 506 may be configured to compare, check and/or validate the authentication data with data accessed from memory of the server 504 corresponding to the user. The authentication engine 506 may permit or deny access to the resource 508 based on the comparison, check and/or validation.

In some embodiments, responsive to a request received by the server 504 from a device 502 of the user, the authentication engine 506 may be configured to identify an authentication method for which to authenticate the user. In some embodiments, the authentication engine 506 may be configured to identify both the device 502 in which the user is to authenticate themselves as well as the authentication method. As described in greater detail below, the authentication engine 506 may be configured to determine authentication method information, contextual scores and contextual weights of the device(s) 502 for the user in connection with the request to access the resource 508. The authentication engine 506 may be configured to compute, calculation or determine authentication scores for the available authentication methods via each of the devices 502. The authentication engine 506 may be configured to identify or select an authentication method according to the authentication scores, and can authenticate the user request using the identified authentication method.

The authentication engine 506 may be configured to determine authentication method information of the device(s) 502. In some embodiments, the authentication engine 506 may be configured to detect, identify and/or determine which authentication methods are available for a respective device 502 based on data from the device 502 and/or from other device(s) or sensor(s). For example, the devices 502 may transmit data corresponding to their capabilities to the authentication engine 506. In some embodiments, the devices 502 may transmit the data with the request to access the resource 508. In some embodiments, the device 502 may transmit the data at a first time instance at which the user attempts to access the resource 508 via the device 502 (e.g., when the user registers the device 502 and/or requests access to the resource 508).

The authentication engine 506 may be configured to parse the data received from the devices 502 to determine which authentication methods are available via the respective devices 502. For example, the authentication engine 506 may be configured to determine, based on specifications and/or a state (e.g. powered up and/or functional) of the front facing camera of a device 502, that the device 502 is capable of authenticating a user via facial recognition. As another example, the authentication engine 506 may be configured to determine that a device 502 includes a fingerprint or iris scanner for authenticating the user. As yet another example, the authentication engine 506 may be configured to determine that a device 502 includes a microphone capable of recording audio to support voice recognition for authentication. As still another example, the authentication engine 506 may be configured to determine that a device 502 includes a touchpad or keyboard configured to receive a password or passcode for authentication. The authentication engine 506 may be configured to store each of the available authentication methods for the respective devices 502 in memory, for instance in association with an identifier for the device 502 of the user. In some embodiments, as specifications and/or a state of the devices 502 changes (e.g., through upgrading or downgrading, disablement or enablement of feature/capability, change in active or inactive operational mode), the devices 502 may be configured to transmit updated specifications to the authentication engine 506 to reflect changes in the authentication capabilities of the devices 502.

In some embodiments, the authentication method information may include a weight and a completion duration for each of a plurality of authentication methods available via the at least one device. In some embodiments, the authentication engine 506 may determine an average duration for completing authentication via a respective authentication method. The average duration may be an average time which elapses from a time in which authentication begins or is initiated, to a time in which the authentication is completed. In some embodiments, the authentication engine 506 may be configured to determine the average duration for completing authentication via a respective authentication method based on device type. In some embodiments, the authentication engine 506 may be configured to determine the average duration for completing authentication via a respective authentication method across all devices. The authentication engine 506 may maintain, collect, include, or otherwise access data corresponding to historical durations for authenticating via a respective authentication methods. In some embodiments, the data may be device-specific (e.g., historical durations for authentication via particular types of mobile devices, historical durations for authentication via a mobile device versus a laptop, etc.). The authentication engine 506 may be configured to compute the average duration for authentication via a respective authentication method, using the historical durations corresponding to the authentication method.

In some embodiments, the device 502 may maintain data corresponding to the average duration for authentication via the various authentication methods available through the device 502. For example, the devices 502 may be configured to maintain data and statistics corresponding to the duration in which the user typically authenticates via the respective authentication methods. The device 502 may be configured to transmit data corresponding to the average duration to the authentication engine 506. As such, in some implementations, the average duration may be determined on a user-by-user basis.

The authentication engine 506 may be configured to determine a weight corresponding to each of the authentication methods. In some embodiments, the authentication engine 506 may be configured to access, select or identify a weight for each authentication method. The weight may be based on a relative strength, security, and/or confidence of each authentication method in comparison to other authentication methods. In some embodiments, the weights for each authentication method may be set or configured by an enterprise (e.g., the weights may be enterprise-specific as set or determined by an administrator). In some embodiments, the weights for each authentication methods may be preset or preconfigured for all enterprises which enroll with the server 504 or authentication engine 506. A non-limiting example set of weights $S_i$ for a group of authentication methods $A_i$ is shown below in Table 1.

TABLE 1

Authentication methods and corresponding authentication weights

| Authentication Method ($A_i$) | Weight ($S_i$) |
|---|---|
| Facial Recognition Authentication | 1 |
| Voice Authentication | 0.75 |
| Iris Authentication | 0.25 |
| Finger Print Authentication | 0.15 |

As shown in Table 1 above, some authentication methods may be more secure or preferred (e.g., achieve higher confidence in the result of the authentication) than others. For example, as shown in Table 1, facial recognition authentication may generally be more secure than fingerprint authentication due in part to the nature of fingerprint scanning technology in comparison to facial recognition software.

The authentication engine 506 may be configured to determine contextual scores and contextual weights of the device(s) 502. The authentication engine 506 may be configured to determine the contextual scores and contextual weights at a time in which access to the resource 508 is requested. In other words, the contextual scores and contextual weights may reflect a context of the devices 502 at a time in which the user is attempting to access a resource 508. In some embodiments, the authentication engine 506 may be configured to determine contextual scores and weights based on contextual factors received from the devices 502. As stated above, the authentication engine 506 may be configured to receive the contextual factors from the devices 502 associated with the user. The authentication engine 506 may be configured to receive the contextual factors concurrently with the request to access the resource 506. In some embodiments, the authentication engine 506 may be configured to transmit a request for contextual factors, to each of the devices 502 associated with a user, responsive to the authentication engine 506 receiving a request to access the resource 508 from one of the devices 502. Each of the devices 502 associated with the user may be configured to transmit the contextual factors to the authentication engine 506 for determining the contextual scores. Hence, where the user requests access to the resource 508 via one of the user's devices 502, each of the devices 502 of the user may transmit contextual factors to the authentication engine 506.

In some embodiments, a contextual factor may include or pertain to a position of the device(s) 502. The devices 502 may be configured to determine a position of the device 502 based on data from one or more sensors as described above (such as a gyroscopic sensor and/or a light sensor). In some embodiments, the devices 502 may be configured to determine their position based on a status of the devices 502. For example, the devices 502 may be configured to determine their position based on whether the device 502 is in portrait mode, landscape mode, user viewing mode, or pocket mode, whether the screen is facing up or down, etc. The device 502 may determine each of these modes and orientations based on a current status of the device 502. The device 502 may be configured to transmit data about the position of the device 502, to the authentication engine 506 for use in determining the contextual scores.

In some embodiments, a contextual factor may include or pertain to a location of the device(s) 502. At least some of the devices 502 may include a GPS sensor or other location sensor. The devices 502 may be configured to transmit data from their location sensor to the authentication engine 506 for use in determining the contextual scores. In some instances, some of the devices 502 may not include a location sensor. Such devices 502 may leverage data from other devices 502 for determining their respective location. For example, a wearable device 502 may not include a location sensor. However, the wearable device 502 may be paired with or otherwise in sensing or detection range of a mobile device 502 of the user, which has a location sensor. The wearable device 502 may leverage the location of the mobile device 502 for inferring the location of the wearable device 502 (since the wearable device 502, by being in range of the mobile device 502, is presumably located at around the same location as the mobile device 502). The wearable device 502 may thus transmit the location of the mobile device 502 to the authentication engine 506.

In some embodiments, a contextual factor may include or pertain to a network or network type which is used for establishing the connection of the device(s) 502 to the server 504. The devices 502 may each include a communications module or interface configured to establish a network connection to the server 504. For example, the devices 502 may establish a connection to the server 504 via a cellular (e.g., LTE) network, a home or corporate LAN or WAN (e.g., Wi-Fi), a free or public network, etc. The networks may include various security settings or protocols (e.g., WEP-64 bit key, WEP-128 bit key, WPA-256 bit key with a fallback to TKIP, WPA2-256 bit key, etc.). The devices 502 may be configured to maintain data about a current network connection of the respective device 502. The devices 502 may be configured to transmit the data about their respective network connection (e.g., connection type, security settings or protocols, connection strength, etc.) to the authentication engine 506 for use in determining the contextual scores.

In some embodiments, a contextual factor may include or pertain to a status of one or more components of the device(s) 502. The device(s) 502 may be configured to determine whether one or more of the components which would be used for authentication are currently in use and/or is operational (e.g., in proper operating condition). For example, the devices 502 may be configured to determine whether the camera used for facial recognition authentication is idle or active, whether the touch display is idle or active, and so forth. The devices 502 may be configured to transmit the status data of the components to the authentication engine for use in determining the contextual scores. Such status data may be used for determining whether an authentication method is unavailable at the device 502 because the component(s) used for performing the authentication method is currently in use or is non-operational.

The authentication engine 506 may be configured to calculate, compute, or otherwise determine the contextual scores for each authentication method based on the contextual factors received from the devices 502. The contextual scores may reflect a combination of an ease-of-use for authenticating via a respective authentication method as well as a level of security for authenticating via the authentication method. In some embodiments, the contextual score may be or include an ease-of-use score, security score, and/or a status score. The authentication engine 506 may be configured to determine the ease-of-use score, security score, and/or status score by using a formula, using an algorithm, and/or performing a look-up function in a database, table, or other data structure, using the contextual factors from the devices 502. The authentication engine 506 may be configured to maintain the data structure in memory at the server 504. The ease-of-use scores, security scores, and/or status scores may vary based on the contextual factors for a particular device 502. Non-limiting examples of contextual scores based on the contextual factors corresponding to device position and location are shown in Table 2 and Table 3 below, respectively.

TABLE 2

Ease-of-use scores for various authentication methods based on device position

| Device Position | Authentication Method on Device | | |
|---|---|---|---|
| | Fingerprinting | Facial Recognition | Voice Recognition |
| Portrait Mode | 80 | 100 | 90 |
| Landscape mode | 80 | 90 | 90 |
| Screen up | 100 | 90 | 90 |
| Screen down | 90 | 90 | 90 |
| In Pocket | 70 | 70 | 70 |
| Not in proximity | 30 | 30 | 0 |
| Bluetooth headset connected | NA | NA | 100 |

TABLE 3

Ease-of-use scores for various authentication methods based on device location

| Device Location | Authentication Method on Device | | |
|---|---|---|---|
| | Fingerprinting | Facial Recognition | Voice Recognition |
| Home | 80 | 100 | 90 |
| Work | 80 | 90 | 60 |
| Public | 100 | 70 | 20 |

The authentication engine 506 may be configured to determine the contextual/ease-of-use score for each authentication method available at the device 502 based on the contextual factors received from the device 502. As shown above in Table 2 and Table 3, the contextual/ease-of-use score may reflect for instance an ease-of-use for the respective authentication method. For instance, where the device 502 has a position indicating that the device is in portrait mode (e.g., the user is looking at the display of the device 502), the ease-of-use score for the facial recognition authentication may be higher than fingerprinting authentication since the user is already facing the camera which would be used for authenticating the user. Similarly, where the display is facing up (e.g., from a table) and the fingerprint scanner is located near or along the display (e.g., the fingerprint scanner is also facing up), the ease-of-use score for fingerprinting authentication may be higher than facial recognition authentication since the user would have to pick up the device 502 to perform facial recognition authentication.

Additionally, the contextual/ease-of-use score may be based on the device 502 location. Some authentication methods may be easier or more difficult in certain locations (particularly in public locations). For instance, the authentication engine 506 may be configured to determine a location for the device 502 and a time corresponding to the request. Where the device 502 is located outside (e.g., outside of a building) and in public, and the current time is evening or night, facial recognition authentication may be more difficult than voice or fingerprinting (because the camera may not be able to properly image the user for facial recognition). Similarly, where the device 502 is located in a public space for instance, voice recognition authentication may be difficult in comparison to other authentication methods, as ambient noise levels may be higher.

In some embodiments, the contextual scores may also reflect a network connection security setting. The authentication engine 506 may be configured to identify network connection security settings for each of the devices 502 based on the contextual factors corresponding to network connections available to the devices 502. The authentication engine 506 may be configured to use the contextual factors for determining a security score for the authentication method. A non-limiting example of contextual scores based on example contextual factors is shown in Table 4 below.

TABLE 4

Contextual scores for network connection security settings

| Network Connection Security | Contextual Score |
|---|---|
| WEP-64 bit key | 5 |
| WEP-128 bit key | 10 |
| WPA-256 bit key | 30 |
| WPA2-256 bit key | 80 |
| Mobile LTE | 90 |

In some embodiments, the contextual score may be based on the component statuses (e.g., statuses of a device's components). For example, the authentication engine 506 may be configured to determine a status score for each of the authentication methods based on a received status from the device 502. A non-limiting example on the status scores for various authentication methods is shown in Table 5 below.

TABLE 5

Status scores for various authentication methods based on component status

| Component Status | Fingerprint | Facial Recognition | Voice Recognition |
|---|---|---|---|
| Audio active | 70 | 80 | 10 |
| Audio idle | 70 | 80 | 90 |
| Camera active | 70 | 10 | 80 |
| Camera idle | 70 | 90 | 60 |
| Audio and camera active | 90 | 10 | 20 |
| Audio and camera idle | 60 | 90 | 80 |

In the examples described above, the authentication engine 506 may be configured to use contextual factors received from the respective devices 502 to determine an ease-of-use score, security score, and/or a status score. The authentication engine 506 may be configured to use the ease-of-use score, security score, and/or status score for determining the authentication score for each of the authentication methods.

The authentication engine 506 may be configured to determine contextual weights for each of the contextual factors. The contextual weights may be based on the type of contextual factors. For example, the contextual weight for network connection contextual factors may be different than contextual weight for device position contextual factors. The contextual weight may indicate, denote, or otherwise correspond to a relative importance, priority and/or contribution of various contextual factors which may be received in connection with the devices 502 and/or the authentication methods. A non-limiting example set of contextual weights is shown in Table 5 below.

TABLE 5

Contextual factor types and corresponding contextual weights

| Contextual Factor Type | Contextual Weight |
|---|---|
| Network | 80 |
| Location | 40 |
| Position | 30 |
| Device | 20 |

In some embodiments, the contextual weights may be preset values. In some embodiments, the contextual weights may be dynamically selected based on the value of the corresponding contextual factor (e.g., the contextual weight for a network connection may change based on the type of network connection). In some embodiments, the contextual weights may be set by an administrator of an enterprise, corresponding to the resource 508.

The authentication engine 506 may be configured to determine an authentication score for each of the authentication methods available at each respective device 502. The authentication engine 506 may be configured to determine the authentication scores using the authentication method information, the contextual scores and the contextual weights. The authentication engine 506 may be configured to determine the authentication scores by first determining which authentication methods are available at a respective device 502 of the user (e.g., based on the authentication method information and contextual factors). The authentication engine 506 may be configured to determine the authentication score using the contextual scores and contextual weights for each of the available authentication methods. In some embodiments, the authentication engine 506 may be configured to determine the authentication score as a function of the authentication weight $S_i$ as well as the contextual scores and contextual weights. In some embodiments, the authentication engine 506 may be configured to compute the authentication score according to Equation 1 below $$A_i = S_i \times (\Sigma C_j \times W_j)/T_i \qquad \text{Equation 1.}$$

In Equation 1, $A_i$ is the authentication score for a particular authentication method, $S_i$ is a weight for the authentication method, $C_j$ is a contextual score corresponding to the authentication method, $W_j$ is a contextual weight for the contextual score, and $T_i$ is the average time to complete authentication via the authentication method. The contextual score $C_j$ may include the ease-of-use score, the security score, and/or the status score. The authentication engine 506 may be configured to compute an authentication score for each authentication method available by a device 502 of the user.

The following example is intended to illustrate authentication scores for two authentication methods. However, it is understood that various combinations of authentication methods, contextual scores, and/or contextual weights may be used for computing an authentication score.

As an example, a user may be logged into a desktop (e.g., a first device 502) with a camera and have the user's mobile device (e.g., a second device 502) located in the user's pocket. The user may be located at home and accessing the server 504 via a LAN with a WPA2-256bitkey network connection. The user may request access to the resource 508 via the first device 502. The first device 502 and second device 502 may transmit contextual factors corresponding to its position, location, and network security. The authentication engine 506 may be configured to receive the contextual factors from the first and second device 502. The authentication engine 506 may be configured to compute an authentication score for facial recognition authentication via the first device 502 and an authentication score for facial recognition authentication via the second device 502, assuming facial recognition authentication via both the first and second device 502 have an average duration of one second. Table 6 below shows authentication scores obtained based on the contextual scores for the contextual factors from the first and second devices.

TABLE 6

Authentication scores for facial recognition authentication.

| Device, Authentication Method | Position | Network | Location | Authentication Score |
|---|---|---|---|---|
| First Device, Facial Recognition | 100 | 80 | 100 | =134 |
| Second Device, Facial Recognition | 70 | 80 | 100 | =125 |

The authentication engine 506 may be configured to compute the authentication score for the first device 502 as follows:

$$A_1 = 1 \times (\Sigma(100 \times 0.3 + (80 \times 0.8) + (100 \times 0.4))/1$$

Similarly, the authentication engine 506 may be configured to compute the authentication score for the second device 502 as follows:

$$A_2 = 1 \times (\Sigma(70 \times 0.3 + (80 \times 0.8) + (100 \times 0.4))/1$$

As shown in Table 6 above, the authentication score for the first device 502 (e.g., the desktop) may be higher than the authentication score for the second device 502 (e.g., the mobile device), since the second device 502 has a lower ease-of-use score because the second device 502 is located in the user's pocket. The authentication engine 506 may be configured to compute the authentication scores for each authentication method available at each device 502 associated with the user.

The authentication engine 506 may be configured to identify an authentication method for which the authentication engine 506 is to authenticate the user request according to the determined authentication scores. In some embodiments, the authentication engine 506 may be configured to identify an authentication method based on which of the determined authentication scores is highest. Accordingly, the authentication engine 506 may be configured to select or propose one or more authentication methods (e.g., selectable/confirmable by the user in some embodiments) for which the user is to authenticate based on which authentication score is highest.

In some embodiments, the authentication engine 506 may be configured to compare one or more of the authentication scores to an authentication score threshold. In some embodiments, the authentication score threshold may be a predetermined threshold. In some embodiments, the authentication score threshold may be set by an administrator for a company or enterprise. In some embodiments, the authentication score threshold may be dependent on the resource 508 to be accessed (e.g., a higher authentication score threshold for more sensitive resources 508). The authentication engine 506 may be configured to select the authentication method based on the authentication score of the authentication method satisfying the authentication score threshold. For example, the authentication engine 506 may be configured to determine which authentication methods satisfy the authentication score threshold. The authentication engine 506 may be configured to determine which of the authentication methods that satisfy the authentication score threshold have a highest ease-of-use score. The authentication engine 506 may be configured to select or propose one or more authentication methods having the highest ease-of-use score(s) from a subset of authentication methods which satisfy the authentication score threshold.

In some embodiments, the authentication engine 506 may be configured to identify (e.g., determine, select and/or propose) a subset of authentication methods with which to authenticate the user. For example, depending on the authentication score threshold, a single authentication method may not be sufficient to satisfy the authentication score threshold. Accordingly, the authentication engine 506 may be configured to identify a subset of authentication methods for which to authenticate the user. The authentication engine 506 may identify various combinations of authentication methods having respective authentication scores that together satisfy the authentication score threshold. Accordingly, depending on the authentication score threshold, the user request may be authenticated via multi-factor authentication.

In some embodiments, the authentication engine 506 may be configured to identify a subset of authentication methods which satisfy the authentication score threshold (e.g., individually satisfy the authentication score threshold or combinations of authentication methods which together satisfy the authentication score threshold). The authentication engine 506 may provide the subset of authentication methods to the device 502 and/or user for selection of an authentication method. According to such embodiments, the user may select the authentication method(s) for which the user request is authenticated rather than the authentication engine 506 performing the selection. The user may for instance select the authentication method via the device 502 in which the user is attempting to access the resource 508. The authentication engine 506 may be configured to initiate or trigger the authentication method(s) according to the user selection.

The authentication engine 506 may be configured to authenticate the user request via the identified authentication method. The authentication engine 506 may be configured to authenticate the user request via one of the devices 502 which supports the identified authentication method. For example, the authentication engine 506 may authenticate the user via facial recognition on the user's mobile device 502, even where the user is attempting to access the resource 508 via the user's desktop 502. In some instances, the authentication engine 506 may authenticate the user via multiple devices 502 (e.g., a first authentication method via a first device 502 and a second authentication method via a second device 502). The authentication engine 506 may be configured to receive authentication data from the device 502 of the user. The authentication engine 506 may be configured to compare the authentication data with data accessed from memory of the server 504 corresponding to the user. The authentication engine 506 may permit or deny access to the resource 508 based on the comparison or authentication.

Figure 6:
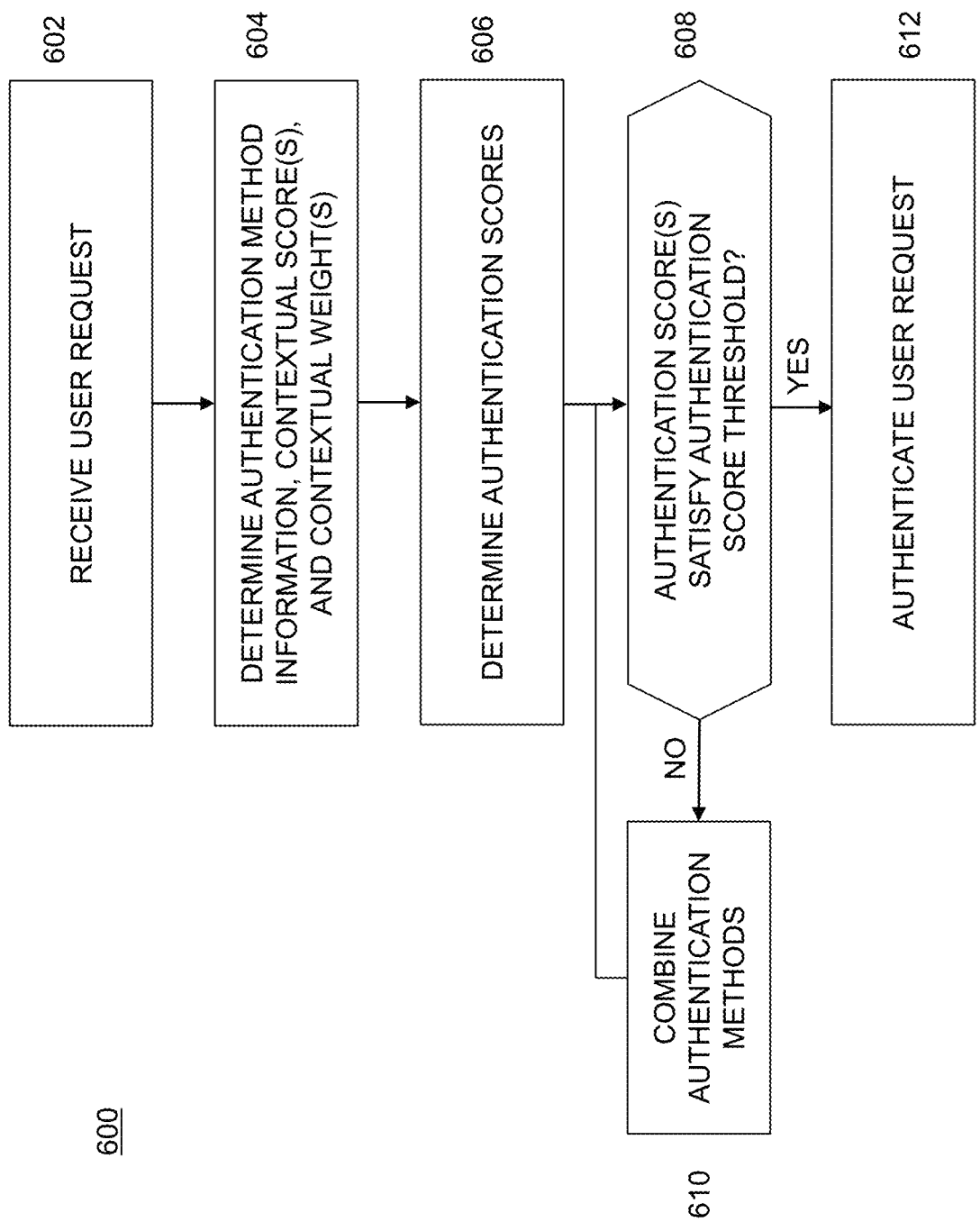
FIG. 6 is a flow diagram of a method for context aware frictionless authentication, in accordance with an illustrative embodiment.

Referring to FIG. 6, depicted is a flowchart showing a method 600 of context aware authentication, according to an illustrative embodiment. The method 600 (including various steps included therein) may be implemented by one or more of the components shown in FIG. 5 and described above, such as the server 504, the device(s) 502, the authentication engine 506, etc. As a brief overview, at step 602, a server receives a user request. At step 604, the server determines authentication method information, contextual score(s) and contextual weight(s). At step 606, the server determines authentication scores. At step 608, the server determines whether any authentication score(s) exceed an authentication score threshold. At step 610, the server combines authentication methods. At step 612, the server authenticates the user request.

At step 602, and in some embodiments, a server receives a user request. In some embodiments, the server may receive a request to access a resource hosted by the server from a device of a user. The server may be a cloud-based server. In some embodiments, the server may receive a request to access a resource hosted by another server from a device of the user. In some embodiments, the server may determine that the resource requires authentication prior to providing access to a user. The server may determine that the user is to be authenticated.

At step 604, and in some embodiments, the server determines authentication method information, contextual score(s) and contextual weight(s). In some embodiments, the server may determine authentication method information, contextual scores and contextual weights of at least one device (including the device from which the user request is received) in connection with a user request received at step 602. The authentication method information may include a weight and a completion duration for each of a plurality of authentication methods available via the device(s) of the user. Accordingly, in some embodiments, the server may determine authentication method information, contextual scores, and contextual weights for authentication methods across a plurality of devices of the user (e.g., the device on which the user requested access to the resource and one or more additional devices).

In some embodiments, the server may determine that each of the authentication methods is available via the device(s) of the user. The server may determine that the authentication methods are available via the device(s) of the user using the authentication method information. The authentication method information may include the capabilities of the respective devices of the user. The server may receive data from the devices which corresponds to the capabilities of the devices. The server may parse the data to determine which authentication methods are available via the respective devices. In some embodiments, the server may receive the authentication method information from the devices at time of enrollment. In some embodiments, the server may receive the authentication method information from the devices with the user request (e.g., concurrently with step 602).

In some embodiments, the server may determine an average duration for completing the authentication methods. The server may determine the average duration based on historical data corresponding to the authentication methods. In some embodiments, the server may maintain the historical data for each of the authentication methods. The historical data may be maintained on a device-by-device basis, a device type-by-device type basis, or on an authentication method-by-authentication method basis. Accordingly, the historical data may collected and/or maintained be at various levels of granularity. The server may compute the average duration based on the historical data. In some embodiments, the devices may maintain the historical data for each of the authentication methods available via the respective device. In other words, the historical data may be maintained on a user-by-user basis. The device may compute the average duration based on the historical data. The device may transmit the average duration to the server (e.g., at enrollment or concurrently with the user request at step 602). The server may determine the average duration based on data received from the devices.

The contextual scores may be based on contextual factors received from the devices. In some embodiments, the server may receive one or more contextual factors from the devices. The contextual factors may be for each of the devices. The server may determine the contextual scores and contextual weights of the contextual factors received from the devices. As described in greater detail below, the contextual factors may include a position of the device, a location of the device, and/or a network connection of the device. The contextual scores may indicate an ease-of-use of the devices from the position for authentication, an availability of a respective authentication method using the device at the location, and/or a level of security in using the network connection for authentication.

In some embodiments, the server may receive the contextual factors from the devices concurrently with the user request. In some embodiments, the server may request the contextual factors from the devices following receiving the user request. The server may transmit the request to the devices (e.g., to determine available authentication methods, and/or to elicit contextual factors). The devices may transmit a response to the server including the contextual factors. The server may determine the contextual scores based on the contextual factors received from the devices. In some embodiments, the server may determine the contextual scores by performing a calculation, an algorithmic analysis or evaluation, and/or a look-up function, using the contextual factors from the devices in one or more data structures similar to those described above with reference to Table 2 through Table 5 corresponding to various contextual scores (e.g., contextual scores corresponding to an ease-of-use score, contextual scores corresponding to a security score, contextual scores corresponding to a status score, etc.). The server may identify the contextual scores using the data structures which correspond to the contextual factors for the devices.

In some embodiments, the server may determine the contextual weights for the contextual scores. The server may maintain a database or data structure with contextual weights associated with each of the contextual scores. In some embodiments, the contextual weights may be based on the contextual score types (e.g., position, location, network security, component status, etc.). The server may determine the contextual weights for each of the corresponding contextual scores determined for the respective devices. The server may use the authentication method information, contextual scores, and contextual weights for determining authentication scores.

At step 606, and in some embodiments, the server determines authentication scores. In some embodiments, the server may determine an authentication score for each of the authentication methods available for each device of the user. The server may determine the authentication scores using the authentication method information, the contextual scores and/or the contextual weights of the at least one device. In some embodiments, the server may determine the authentication scores according to or similar to Equation 1 above, or using another formula. Accordingly, the server may determine the authentication scores as a function of the contextual scores and corresponding weights, e.g., comprising a summation of the contextual scores combined/multiplied with (or adjusted by) their corresponding weights. In some embodiments, the server may determine the authentication scores as a function of the summation divided by an average duration for completing authentication via the respective authentication method. In some embodiments, the server may determine the authentication score as a function of a summation multiplied with a weight which is based on the particular authentication method. For instance, the server may assign weights to various authentication methods. The authentication score for the authentication methods may thus be a linear function of the weight of the authentication method.

At step 608, and in some embodiments, the server determines whether any authentication score(s) exceed an authentication score threshold. The server may compare each of the authentication scores computed at step 606 to the authentication score threshold. In some embodiments, the authentication score threshold may be a preset or predetermined authentication score. In some embodiments, the authentication score threshold may be set by an administrator. In some embodiments, the authentication score threshold may depend on the resource which is to be accessed.

The server may identify an authentication method from the plurality of authentication methods according to the authentication scores determined at step 606. In some embodiments, the server may identify the authentication method(s) having an authentication score which exceeds the authentication score threshold. In some embodiments, such as those where a number of authentication methods exceed the authentication score threshold, the server may identify the authentication method(s) based on which authentication method(s) has an ease-of-use score which is highest. Accordingly, the server may select an authentication method which has an authentication score exceeding the threshold and is easiest to use. In some embodiments, the server may provide the authentication method(s) that individually or in combination has an authentication score which exceeds the authentication score threshold, to the user for selection to use in the authentication. Accordingly, rather than the server selecting the authentication method(s), a user who is to authenticate themselves may select the authentication method(s).

In some embodiments, where none of the authentication scores determined at step 606 exceed the authentication score threshold, at step 610, the server may combine authentication methods. Accordingly, where a single authentication method does not have an authentication score which satisfies the authentication score threshold, the server may implement multi-factor authentication. The server may combine various options of authentication methods. The server may compute a sum of the authentication scores for the combined authentication methods. The method 600 may proceed back to step 608, where the sum of the authentication scores is compared to the authentication score threshold. Accordingly, the server may select or propose (e.g., to the user) a subset of authentication methods such that a sum of authentication scores of one or more authentication methods in the subset satisfies the authentication score threshold.

Similar to presenting individual authentication methods to the user, in some embodiments, the server may provide various combinations of authentication methods to the user which satisfy the authentication score threshold. For example, the server may provide a first authentication method having an authentication score which satisfies the authentication score threshold and a combination of two authentication methods which together have a combined authentication score which satisfies the authentication score threshold. The user may select or confirm the authentication method(s) for which the server is to use to authenticate the user request.

At step 612, and in some embodiments, the server authenticates the user request. In some embodiments, the server may authenticate the user request via the authentication method(s) identified at step 608 (e.g., having an authentication score or combined authentication score which satisfy the authentication score threshold). The server may authenticate the user request using a device which supports the authentication method(s) identified at step 608. The device may be the same as the device on which the user requested access to the resource or may be a different device. In either instance, the device may be associated with the user and may support the identified authentication method(s). The server may store, maintain, include, or otherwise access authentication data from memory corresponding to a user. The server may receive authentication data from the device in which authentication is attempted. The server may compare the authentication data with data accessed from memory of the server corresponding to the user. The server may permit or deny access to the resource based on the comparison.

Various elements, which are described herein in the context of one or more embodiments, may be provided separately or in any suitable sub-combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method, comprising:
   determining, by at least one server, authentication method information, contextual scores and contextual weights of at least one device, in connection with a user request to access a resource via the at least one device, the authentication method information comprising a weight and a completion duration for each of a plurality of authentication methods available via the at least one device;
   determining, by the at least one server, an authentication score for each of the plurality of authentication methods, using the authentication method information, the contextual scores and the contextual weights of the at least one device;

identifying, by the at least one server, a first authentication method from the plurality of authentication methods, according to the determined authentication scores;

authenticating, by the at least one server, the user request via the first authentication method using a first device from the at least one device that supports the first authentication method;

comparing, by the at least one server, one or more of the determined authentication scores to an authentication score threshold; and selecting, by the at least one server, the first authentication method from the plurality of authentication methods based on the authentication score of the first authentication method satisfying the authentication score threshold.

2. The method of claim 1, further comprising:
selecting, by the at least one server, a subset of the plurality of authentication methods, wherein a sum of authentication scores of one or more authentication methods in the subset satisfies an authentication score threshold, wherein authenticating the user request comprises authenticating, by the at least one server, the user request via the subset of the plurality of authentication methods.

3. The method of claim 1, further comprising:
determining, by the at least one server, using the authentication method information, that each of the plurality of authentication methods are available via the at least one device.

4. The method of claim 1, further comprising:
determining, by the at least one server, for the first authentication method of the plurality of authentication methods, an average duration for completing the first authentication method, wherein the average duration is determined based on historical data corresponding to the first authentication method.

5. The method of claim 1, wherein determining the contextual scores and the contextual weights of the at least one device comprises:
receiving, by the at least one server, from the at least one device, one or more contextual factors for the at least one device; and
determining, by the at least one server, the contextual scores and the contextual weights of the one or more contextual factors.

6. The method of claim 5, wherein a first contextual factor of the one or more contextual factors comprises a position of the at least one device, and one of the contextual scores indicates an ease-of-use of the at least one device from the position for authentication.

7. The method of claim 5, wherein a first contextual factor of the one or more contextual factors comprises a location of the at least one device, and one of the contextual scores indicates an availability of a respective authentication method using the at least one device at the location.

8. The method of claim 5, wherein a first contextual factor of the one or more contextual factors comprises a network connection of the at least one device, and one of the contextual scores indicates a level of security in using the network connection for authentication.

9. The method of claim 1, further comprising:
assigning, by the at least one server, a first weight to the first authentication method of the plurality of authentication methods, wherein the authentication score of the first authentication method is a linear function of the first weight of the first authentication method.

10. The method of claim 1, further comprising:
identifying, by the at least one server, a subset of the plurality of authentication methods which satisfies an authentication score threshold;
providing, by the at least one server, the subset of the plurality of authentication methods for selection.

11. A system comprising:
at least one server comprising:
at least one hardware processor configured to execute instructions to:
determine authentication method information, contextual scores and contextual weights of at least one device, in connection with a user request to access a resource via the at least one device, the authentication method information comprising a weight and a completion duration for each of a plurality of authentication methods available via the at least one device;
determine an authentication score for each of the plurality of authentication methods, using the authentication method information, the contextual scores and the contextual weights of the at least one device;
identify a first authentication method from the plurality of authentication methods, according to the determined authentication scores;
authenticate the user request via the first authentication method using a first device from the at least one device that supports the first authentication method;
compare one or more of the determined authentication scores to an authentication score threshold; and
select the first authentication method from the plurality of authentication methods based on the authentication score of the first authentication method satisfying the authentication score threshold.

12. The system of claim 11, wherein the at least one processor is further configured to execute instructions to:
select a subset of authentication methods, wherein a sum of authentication scores of one or more authentication methods in the subset satisfies the authentication score threshold, wherein authenticating the user request comprises authenticating the user request via the subset of the plurality of authentication methods.

13. The system of claim 11, wherein the at least one processor is further configured to execute instructions to:
determine, using the authentication method information, that each of the plurality of authentication methods are available via the at least one device.

14. The system of claim 11, wherein the at least one processor is further configured to execute instructions to:
determine, for the first authentication method of the plurality of authentication methods, an average duration for completing the first authentication method, wherein the average duration is determined based on historical data corresponding to the first authentication method.

15. The system of claim 11, wherein determining the contextual scores and the contextual weights of the at least one device comprises:
receiving, from the at least one device, one or more contextual factors for the at least one device; and
determining the contextual scores and the contextual weights of the one or more contextual factors.

16. The system of claim 15, wherein a first contextual factor of the one or more contextual factors comprises a position of the at least one device, and one of the contextual scores indicates an ease-of-use of the at least one device from the position for authentication.

17. The system of claim 15, wherein a first contextual factor of the one or more contextual factors comprises a network connection of the at least one device, and one of the contextual scores indicates a level of security in using the at least one device using the network connection for authentication.

18. A non-transitory computer readable medium storing program instructions for causing one or more processors to:
   determine authentication method information, contextual scores and contextual weights of at least one device, in connection with a user request to access a resource via the at least one device, the authentication method information comprising a weight and a completion duration for each of a plurality of authentication methods available via the at least one device;
   determine an authentication score for each of the plurality of authentication methods, using the authentication method information, the contextual scores and the contextual weights of the at least one device;
   identify a first authentication method from the plurality of authentication methods, according to the determined authentication scores;
   authenticate the user request via the first authentication method and a first device from the at least one device that supports the first authentication method;
   compare one or more of the determined authentication scores to an authentication score threshold; and
   select the first authentication method from the plurality of authentication methods based on the authentication score of the first authentication method satisfying the authentication score threshold.

* * * * *